Reynolds & Paige,
Manuf. Salt.
No. 109,546. Patented Nov. 22, 1870.

Witnesses:
D. L. Johnston
A. H. Sargent

Inventors: D. Reynolds
J. W. Paige
By W. S. Coughborough & Co
Attys. Rochester N. Y.

United States Patent Office.

DEXTER REYNOLDS, OF ALBANY, AND JAMES W. PAIGE, OF ROCHESTER, NEW YORK.

Letters Patent No. 109,546, dated November 22, 1870.

IMPROVEMENT IN THE MANUFACTURE OF SALT.

The Schedule referred to in these Letters Patent and making part of the same.

We, DEXTER REYNOLDS, of the city and county of Albany and State of New York, and JAMES W. PAIGE, of the city of Rochester, county of Monroe and State of New York, have invented a certain improved Process for the Manufacture of Salt, of which the following is a specification.

Figure 1:
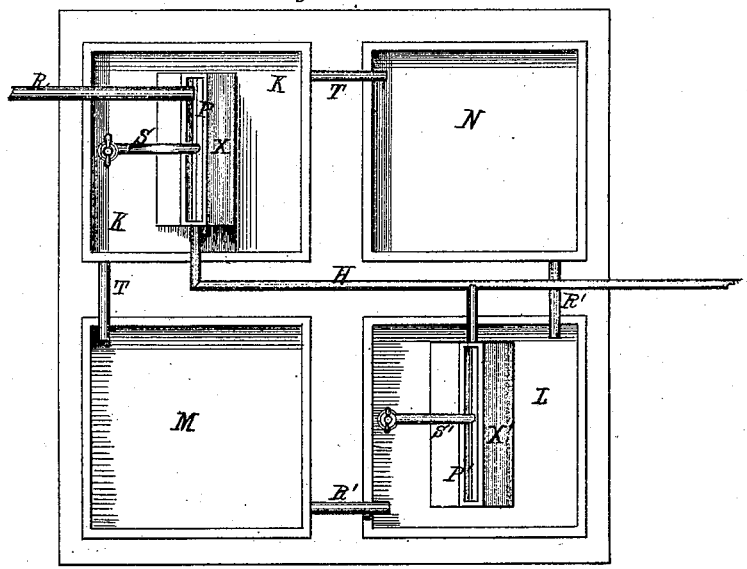
Figure 1 is a plan view of one form of apparatus that may be used to conduct the process.
Figure 2:
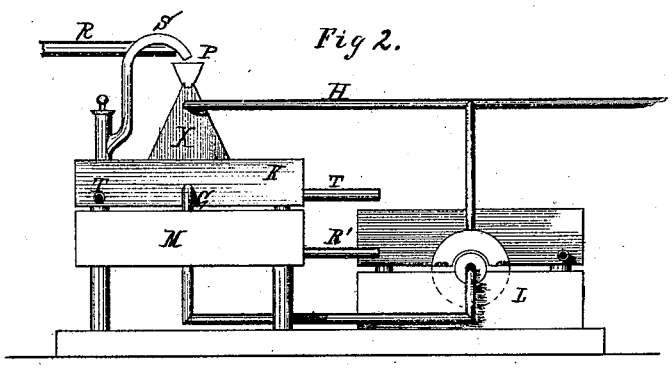
Figure 2 is a side elevation.

Our invention relates to a process of making salt from brines containing gypsum, by first evaporating them on steam-heated surfaces to such a point of concentration, below saturation, that the gypsum shall not adhere thereto, but that such brine, when removed to another vessel, shall reach saturation by the evaporation due to the heat contained in such brine and therein deposit its lime, and the removal of such purified saturated brine to another vessel for reduction to salt, also by steam; and especially the conducting this process on cylinders, that the economy of the evaporation may be increased by subjecting the brine, in small quantities at a time and in motion, to steam-heat, with the advantages of the more ready removal of any accidental or other adhesions of lime or salt.

The theory of our process, which we claim can be successfully carried out in the manner and by the apparatus hereinafter described, is, that where evaporation is produced by heat from the combustion of fuel, such combustion can be more perfectly conducted under a boiler, and the heat contained in the steam thus generated be more perfectly and economically transmitted and applied to the evaporation of salt-brines than by the direct action of fire under kettles or pans containing such brine, as now ordinarily done.

That salt-brines in a thin film or shower, subjected to heat, can be more economically evaporated than when in a large body or mass.

That a given amount of salt-brines can be more rapidly and economically evaporated when in motion than when quiescent.

That, as the metallic surface through which the heat of the steam is transmitted to such film or shower is more or less covered by said film or shower, so will the economy of the evaporation be increased or diminished.

That when the film or shower is a liquid, as salt-brines, containing substances deposited by heat or evaporation, or capable of being dried onto such metallic surface by reason of too little brine or too much heat, such drying will, to that extent, be a loss in the evaporative power of such metallic surface and in the economic effects of such steam.

That the gypsum in salt-brines, the deposit of which by heat and concentration and its adhesion to the metal surface, through which the heat is transmitted, as on the kettles where fire is used, and on the surface of pipes or pans or other receptacles for steam where steam is employed, and the removal of which from kettles is now only partially done by panning, and part of which still adheres to such metallic surface, and which latter part causes not only a loss of the heat generated, but also expense in its removal, is, mainly, precipitated at or near the point of saturation, and can be deposited and the brine saturated and freed therefrom without adhesion to such metallic surface; provided the film or shower of brine is in motion over such metallic surface and in such quantity that the heat of the steam is not sufficient to dry it on such metallic surface during its passage over or with it; and provided the evaporation is not carried to saturation, but only to such a point of concentration that the brine, when removed to another vessel, shall reach saturation by the evaporation due to its heat, and therein deposit its lime.

We have said such a point of concentration because this point is slightly variable, depending on the amount of gypsum present in the brine; the temperature at which it is discharged from the vessel in which it is heated, and the material and shape of the vessel into which it is discharged.

The greater the amount of gypsum, the lower, necessarily, this point of concentration must be. The higher the temperature, the lower this point of concentration may be.

The poorer the conductibility and greater the surface of the vessel into which the brine is to be introduced to cool and reach saturation without the addition of heat, the lower this point of concentration, and also the lower the temperature may be.

Taking the brines at Syracuse, New York, where the most extended manufacture of salt in the United States is now carried on, when the salometer is graduated so that 100° is saturation, and every 10° of temperature, Fahrenheit, above 60°, is equal to about one degree additional of salometer, it will be found that with a temperature of about 200° Fahrenheit, more and salometer 76°, or allowing for temperature about 90°, that the lime will not adhere to the metal through which the heat of the steam is transmitted, and that, on the brine being discharged, at about this concentration and temperature, into a shallow wooden vat, saturation will be reached and the lime deposited in this vessel by the mere concentration from the evaporation due to the heat in the brine when let down thereto. A few degrees higher salometer or concentration with this temperature will cause the lime to be deposited in the first vessel and adhere to the metal through which the heat is transmitted. A few degrees lower concentration or a few degrees lower heat would not be sufficient to enable the brine to reach saturation and deposit its lime. The point to be obtained or reached is about the greatest temperature and the greatest heat whereat the lime will not be deposited in the first vessel, and yet the brine will reach saturation in the second. One or two trials with any brine will determine this point.

The advantages in using steam-heat over fire are threefold—

First, in the convenience of applying and regulating the heat.

Second, in the economy of producing the heat.

Third, in the fact that saturated brines cannot as advantageously be reduced to salt without adhesion to the metal though the heat is transmitted.

That the greater the heat of the steam, the greater must be the quantity of brine used to cover the metallic surface in a given time, or the less the quantity of the brine, the greater the rapidity of its motion on or over it to prevent such loss and adhesion.

That such metallic surface, though of iron, will not rust, and thereby affect the color of the salt, provided it is kept continuously covered by brine; but, to provide against any accidental uncovering thereof, a film of lime can be deposited thereon so thin as not to materially affect it economic action, and yet effectually prevent any rusting thereof, or affection of the color of the salt thereby.

That as soon as the steam is condensed in such metallic vessel, its immediate removal therefrom will increase the efficiency of the surface thereof, and the return of such condensed steam or water back to the boiler will increase the economy with which the steam is made.

That protecting, by non-conducting materials, the passage of such steam from the boiler to such metallic vessel, and the passage of such condensed steam back to the boiler, and making both passages as short as possible, will increase the economy of the operation.

K, fig. 1, is a vat of any convenient size, made of any material, but preferably of wood, on account of its cheapness, durability, and non-conductability, in which is placed the steam and water-tight metallic case or vessel X, which may be placed with its bottom directly on the bottom of the vat K or at any distance above it.

H is a pipe for introducing the steam from a boiler.

G, a pipe to carry off the condensed steam.

P, a vat or trough placed over or at any distance above or on the top of the metallic vessel X, and pierced with holes or otherwise arranged so as to allow the brine introduced thereinto by the pipe R from a cistern or other receptacle of brine, or direct from the logs, or from the vat K, to flow in a shower or film over the inclined sides of such vessel X into the vat K, and in such quantities as to keep the same always covered with a film or shower of brine slightly in excess of what can be evaporated from such sides during its passage over them by the heat of the steam within such vessel transmitted through such sides.

S is a pipe from a pump, arranged so as to return to such vessel, P, for redistribution over the sides of the metallic vessel $x$ of the brine in K until it is sufficiently evaporated as to be brought to the desired concentration, the supply from R being so regulated by a float-valve or otherwise, that after K is once filled to the desired height from R the supply from R shall only be sufficient to preserve a fixed level in K as brine is evaporated away, or the supply from R can be shut off as desired, or the supply from R may be so regulated that the brine shall reach the desired concentration in its passage over the metallic surface of X, and not require to be redistributed thereover; in which case the pipe S can be dispensed with.

T is a pipe to carry off the concentrated brine and any impurities in suspension, or deposited into a vat M, below, where the brine can be allowed to settle and deposit such impurities, and where the concentrated brine can be brought to saturation by the evaporation due to the heat in the brine when let down thereto, and deposit further lime.

One or more such settling-vats, M N, can be employed as desired, and the greater the heat of the brine when let down thereto, and the greater the surface, and the better non-conducting material of which such vats are composed, the greater will be the concentration therein.

Figure 4:
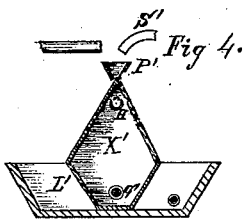
Figure 4 is a transverse section of an evaporating-shed and vat.

X' is another and similar metallic receptacle for steam, placed on or over the vat L, and sufficiently below the vats M N that their contents above the deposited impurities may flow thereinto, and whereby it is proposed to reduce the settled saturated brine to salt, and is similar in its construction and operation to the one before described. The ends of the vat L may be inclined in this latter case similar to fig. 4, that the salt may be drawn thereupon to drain before removal; the pipe R, in this latter case, taking the saturated brine from the settling-vats M N, and having its discharge similarly regulated by a float-valve or otherwise, the pipe S being used to take up into P and redistribute the saturated brine.

Figure 3:
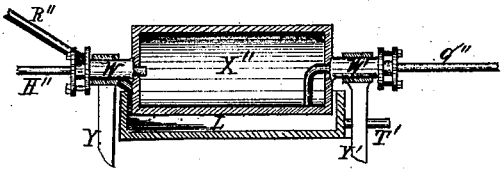
Figure 3 is a longitudinal section of an evaporating cylinder and vat.

X", fig. 3, represents another form of vessel, which may be substituted for X X', to accomplish the same results, although the mechanical device by which they are produced is totally different, X" being a metallic cylinder made to revolve on its hollow trunnions W W' supported on standards, Y Y', and on friction-rollers or otherwise, and partly immersed in the brine contained in K or L, so as to take up in its revolutions, and carry over its surface, a film of brine in excess of what can be evaporated in its passage over it; H" being the pipe for the introduction of steam from the boiler; G" the pipe to carry off the condensed steam, which pipe passes through the trunnion W', and around which such trunnion revolves, and which pipe G" may be bent down within the cylinder, reaching nearly to the bottom thereof, so that the pressure of the steam within the cylinder will thereby force out the condensed steam; or any mechanical device may be resorted to for the speedy removal of such condensed steam and the discharging it through such pipe G".

The other arrangement of pipes and appliances being the same with X X', except the pipe S with trough P, or any other device can be used or not, as desired, to increase the flow of brine over the cylinder over what can be taken up in its revolutions. The heads of the cylinder may be made non-conducting or conical, to save the loss of heat therethrough.

The pipes H" and G" or H H', G G', may be provided with suitable stuffing-boxes, or any other mechanical device may be employed to prevent the passage of steam or condensed steam, other than as proposed.

Any gypsum or salt that may adhere to either of the above forms of apparatus, and more especially the latter, in motion, can be readily removed from time to time by a spud or chisel, or any convenient instrument in the hands of the operator, or by suddenly heating and cooling such surface, which will cause it to fly off; but most of the salt made will be deposited in the vat below, and can be removed therefrom in the usual manner by a rake or shovel.

In place of subjecting the brine, in a shower or thin film and in motion, to the metallic surface heated by steam, the evaporation of the brine may be produced by introducing it into double-bottomed pans heated by steam, or non-conducting vats heated by steam-pipes, and the same process carried on in such vessels with settling-vats as with the apparatus hereinafter described; but we do not consider that such evaporation will be so economically produced, or any deposits or adhesions of lime or salt, accidental or otherwise, so easily prevented or disposed of when taking place, as when the brine is evaporated in small quantities at a time and in motion, especially when the metallic surface is itself in motion.

Only one apparatus, for both evaporating to the desired concentration, and reducing the saturated brine to salt, need be used, but such use will require the raising of the saturated brine from the settling-vats.

The pipes T T' can issue from the bottom of the vats K or L when it is desired to draw off all the contents of such vats, or at any distance above the bottom, so as to draw off only to a given point, or a pipe can be used for each purpose. The pipes R' can be similarly arranged with reference to where they issue from M N.

The iron often present in the crude brine may be also deposited in the vat K by the same heat and exposure, especially where the brine is in a thin film or shower and in motion, but it is preferable to use in such vat brine from which the iron has been precipitated by the use of lime, clay, or alum, in the usual manner.

Where chlorides of calcium and magnesium are present in brine, which substances are not precipitated on saturation, they can be effectually removed by the introduction to the brine of carbonate of soda at any stage of the process prior to its introduction to the vat L, decomposing such chlorides by precipitating the lime and magnesia as carbonates.

Part of the steam generated in the boiler can be used to operate the pumps or revolve the cylinders aforesaid, but the amount so required will be but slight.

We are aware that revolving vessels, heated by steam, have been heretofore used for evaporating the water from various substances, and also the subdivision of water into thin continuous sheets or films, and the evaporating of such films on metallic surfaces heated by steam, as also double-bottomed pans heated by steam containing the liquid to be evaporated, and that liquids in vats have been evaporated by the use of steam in pipes passed thereinto; and that salt-brines containing gypsum have been heated by fire and concentrated to near the point of saturation, and removed and allowed to settle and deposit the lime; but we are not aware of any process like ours having been resorted to for the manufacture of salt, and giving such good results in economy, quality of the salt made, or simplicity of the operation.

From the foregoing explanations of the theory of our process, and description of the apparatus required to carry on the same, and the operation to be persued therewith, although we have described particularly but two forms of apparatus and suggested two others, to carry out practically our theory and process for making salt, it is evident that various others could be adopted, or slight changes could be made in the shape of such apparatus or its working, and still our theory and process be carried on without substantial change.

Therefore we do not mean to confine ourselves to the apparatus as described; nor do we claim the use of any particular metal for such apparatus through which the heat of the steam is to be transmitted; nor to the size, number, shape, or position of the surface thereof on which the brine to be acted on is to be introduced; nor to the manner of its introduction, or whether the metallic vessel holding the steam within and receiving the brine without, be stationary or movable; or to any particular place, method of introducing the steam, or place or method of removing the condensed steam, as it is evident an infinite number of changes can be made in these respects and still the operation be conducted and the results obtained be substantially the same.

But what we do claim as new, and desire to secure by Letters Patent, is—

The process of making salt by exposing brine to a metallic surface heated by steam, and thereby heating and evaporating it to such a point of concentration below saturation that the gypsum therein will not adhere thereto, in combination with the removal of such concentrated brine to another vessel, and its further concentration to saturation and deposit of the lime therein, without the addition of further heat by the evaporation due to the heat thereof when removed thereto, in combination with the removal and reduction to salt of such purified saturated brine, also by steam, substantially as described.

DEXTER REYNOLDS.
JAMES W. PAIGE.

Witnesses:
F. H. CLEMENT,
D. L. JOHNSTON.